Nov. 12, 1963    YOSHIAKI ARATA ETAL    3,110,319
HIGH VACUUM VALVE
Filed Jan. 15, 1962
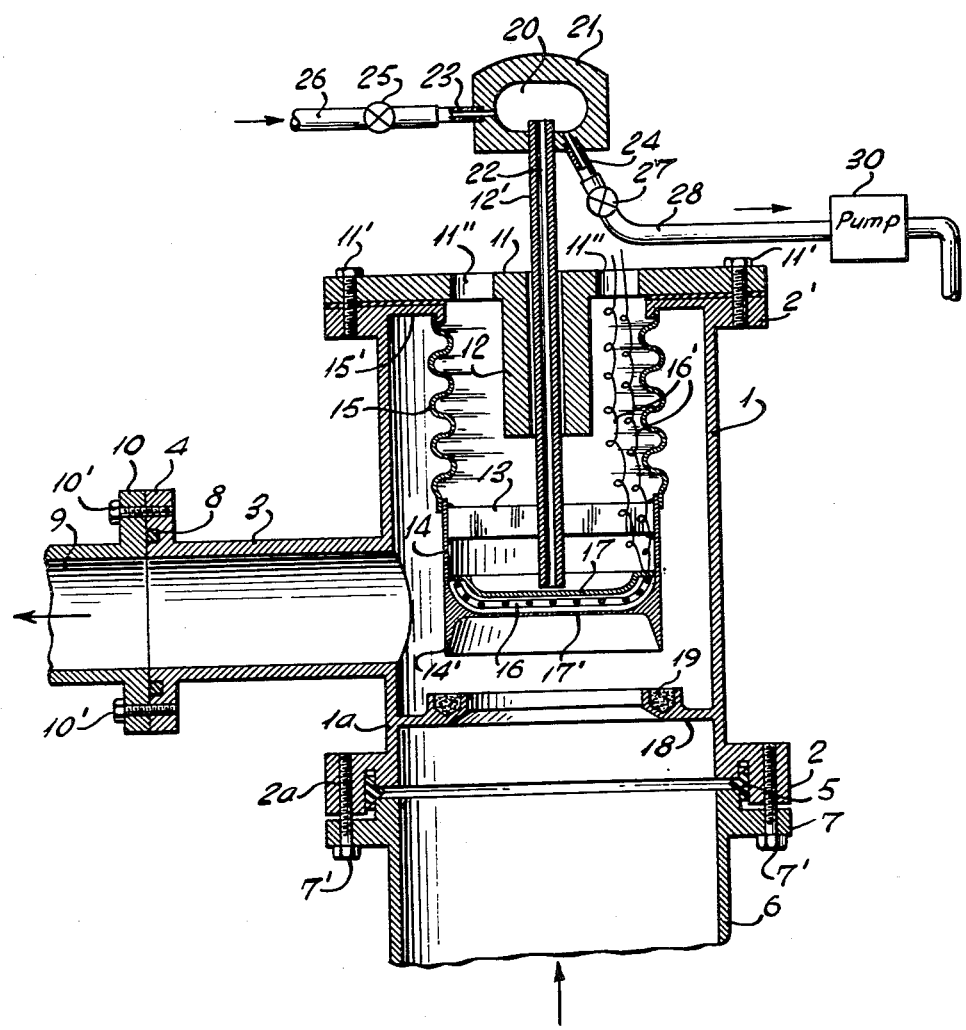
INVENTORS
YOSHIAKI ARATA
MASAO YAMAZOE
BY
ATTORNEY United States Patent Office 3,110,319
Patented Nov. 12, 1963

3,110,319
HIGH VACUUM VALVE
Yoshiaki Arata, Amagasaki, Hyogo Prefecture, and Masao Yamazoe, Nagatu-ku, Kobe, Japan, assignors to Shinko Seiki Kabushiki Kaisha, Kobe, Japan, a company of Japan
Filed Jan. 15, 1962, Ser. No. 166,310
3 Claims. (Cl. 137—340)

This invention relates to valves and more particularly to a novel and improved valve that is useful among other things for sealing high vacuum systems.

Exceedingly high vacuums are utilized in a wide variety of processes and apparatus including vacuum tubes, particle accelerators, metal evaporators, cyclotrons and the like and considerable difficulty has been encountered in providing suitable valving means that will assure the maintenance of high vacuums and particularly super-high vacuums. Known devices for sealing vacuum systems usually include packings of synthetic rubber or other materials, or may employ valve members wherein one member is made of relatively hard metal with a sharp edge intended to imbed itself in a cooperating member which is made of a relatively soft material. It has been found that packings do not function satisfactorily at exceedingly high vacuums since the materials do not have a sufficiently dense construction to prevent the transmission of air and other gases therethrough. In the case of valves utilizing the combination of hard and soft metals, the life is relatively short and considerable difficulty has been experienced in applications wherein the valve must be operated frequently.

This invention has as one of its objects the provision of a novel and improved valve that overcomes the difficulties of prior known devices and affords a structure that will provide a positive seal, and which may be operated repeatedly for extended periods of time.

Another object of the invention resides in the provision of a novel and improved valve that may be used to hermetically seal fluid lines, particularly in high vacuum systems, and which is characterized by its effectiveness, relatively low cost and exceedingly long life.

The above and other objects and advantages of the invention will become more apparent from the accompanying description and drawing forming part of this application and showing one embodiment of the invention.

As pointed out above, the valve in accordance with the invention is particularly useful in sealing high vacuum systems, though it will become apparent that it may be used in a wide variety of fluid systems.

While the valve in accordance with the invention may have any desired configuration, in the instant embodiment of the invention the valve includes a vertically disposed housing 1 of any desired cross-sectional configuration and having a lower flange portion 2 and an upper flange 2'. The low pressure side of the fluid system in which the valve is utilized is connected to the lower end of the housing 1 by means of a suitable conduit 6 having a peripheral flange 7 which is secured to the flange 2 by bolts 7' or other suitable means. A gasket or packing 5 is interposed between the conduit 6 and the housing 1 to provide an air-tight seal. When the valve is used in vacuum systems the conduit 6 is connected to the chamber or space being evacuated.

The high pressure side of the fluid system being controlled is connected to the housing by means of flanged conduits 9 and 3, the latter being formed integrally with and opening into the housing 1. The conduit 9 is provided with a flange 10 which is secured to the flange 4 of conduit 3 by appropriate bolts or other suitable fastening means 10'. The flanges are sealed one to the other by an O-ring 8 or other suitable sealing means.

The valve seat in the instant embodiment of the invention comprises an annular member 18 which includes an annular trough 19 containing a metal having a relatively low melting point such as indium, tin, lead or low melting point metallic alloys. In most applications it has been found that indium is most satisfactory since it has a relatively low melting point of about 155° C. The valving means comprises an essentially cylindrical valve member 14 having spaced transverse walls 17 and 17'. The lower end of the member 14 terminates in an annular tapered portion 14', the diameter of which is coordinated with the diameter of the well 19 so that when the valve is in the closed position, the tapered section 14' of the valve body will move into the well 19.

The valve body 14 is supported by a bellows 15 sealed at its upper end to an inwardly extending annular flange 15' formed integrally with the housing 1. The lower end of the bellows is similarly sealed to the periphery of the valve body 14. With this arrangement the bellows 15 functions as a spring to hold the valve body in the normally retracted position as illustrated, and at the same time permits the valve body to be moved physically downwardly to engage the valve seat 19.

The top of the housing 1 is closed by a cover member 11 and secured to the flange 2' by means of bolts 11'. The closure 11 further includes a central bearing member 12. An elongated tube 12' slidably engages the bearing 12 and terminates at its lower end in close proximity to the wall 17' which is spaced above the wall 17 to provide a compartment therebetween. A plurality of arms or ribs 13 secures the valve body 14 to the tube 12' so that the valve body may be reciprocated within the housing and at the same time maintained in aligned relationship with the valve seat 19. The sealed compartment defined by the walls 17 and 17' contains a heating element 16 having leads 16' extending upwardly through one of several openings 11" in the closure member 11. As will be shown the heating element 16 is utilized to melt the metal within the trough 19 for closing and opening the valve.

The upper end of the tube 12' includes a small housing 21 having a central opening 20 therein communicating with the central opening 22 in the tube 12'. The housing 21 further includes an inlet tube 23 connected by means of a valve 25 to a cooling fluid supply tube 26. While water is preferred as the cooling fluid, it is evident that other suitable fluids may be employed. The housing 21 further includes a fluid outlet 24, a control valve 27, and a conduit 28.

In the operation of the valve described above particularly when used in connection with high vacuum systems, the vacuum is applied to the conduit 9 and air is withdrawn from the vacuum chamber by means of the conduit 6. When the desired vacuum has been attained energy is applied to the heating element 16 by means of the leads 16' and the housing 21 is manually depressed to urge the valving means 14' firmly against the metal contained within the annular seat 19. In so doing the metal within the seat is melted, whereupon the heating element circuit is opened and water is introduced by opening the valve 25 to permit the valve body 14 to become filled with water and thus rapidly cool the valve body and the metal in the valve seat 19 to seal the conduit 6. Only a relatively small amount of water is required to effect this end and as soon as the valve body itself has been filled the valve 25 is turned off. The steam generated by reason of the cooling operation leaves the valve through the openings 11" in the closure 11. When it is desired to open the valve the cooling fluid control valve 27 is opened and the water in the valve body is withdrawn either by gravity or by the use of an appropriate suction pump 30. When the water has been removed from the valve body 14 energy is applied to the heating element 16 to melt the metal within the seat 19. As soon as the metal softens, the bellows will function to retract the valve body 14 and thereby open the valve.

While only one embodiment of the invention has been illustrated and described, it is apparent that modifications, alterations and changes may be made without departing from the true scope and spirit thereof as defined by the appended claims.

What is claimed is:

1. A valve comprising a housing having an inlet and outlet, an annular horizontally-disposed valve seat in said housing, said valve seat surrounding an opening affording communication between the inlet and outlet and having an annular trough, a liquefyable material in said trough, an annular valve body having a tapered end portion, a valve stem operable to move said valve body into said material to interrupt communication between said inlet and outlet, a heating element carried by said valve body in close association with said tapered end portion for rapid transfer of heat thereto, and means including a fluid injector for rapidly cooling said heating element and tapered end portion, said tapered end portion upon being heated by said heating element and moved into contact with said liquefyable material melting that portion of said material adjacent said end portion to permit said end portion to imbed itself therein and then upon being cooled, solidifying said material and effecting a seal.

2. A valve according to claim 1 wherein said heating means comprises resistance elements adapted to carry an electric current.

3. A valve according to claim 1 wherein said valve body is carried by an expansible bellows surrounding said valve stem and sealed to said valve body and housing, and said cooling means further includes means for injecting said fluid under pressure and means for removing excess fluid when the valve body is cooled.

References Cited in the file of this patent

UNITED STATES PATENTS

| 350,881 | Graham | Oct. 12, 1886 |
| 1,292,603 | Hohman | Jan. 28, 1919 |
| 2,646,065 | Tyson | July 21, 1953 |
| 2,823,696 | Detlefson | Feb. 18, 1958 |
| 2,942,615 | Dayton | June 28, 1960 |
| 2,994,338 | Wilson | Aug. 1, 1961 |

FOREIGN PATENTS

| 1,067,649 | Germany | Oct. 22, 1959 |
| 849,253 | Great Britain | Sept. 21, 1960 |